Feb. 13, 1962     D. FIRTH     3,020,737
COUPLING

Filed June 13, 1960                              4 Sheets-Sheet 1

INVENTOR.
DAVID FIRTH
BY M. A. Hobbs
ATTORNEY

Feb. 13, 1962 D. FIRTH 3,020,737
COUPLING
Filed June 13, 1960 4 Sheets-Sheet 2

INVENTOR.
DAVID FIRTH
BY M. A. Hobbs
ATTORNEY

Feb. 13, 1962 D. FIRTH 3,020,737
COUPLING
Filed June 13, 1960 4 Sheets-Sheet 3

INVENTOR.
DAVID FIRTH
BY M. A. Hobbs
ATTORNEY

Feb. 13, 1962  D. FIRTH  3,020,737
COUPLING

Filed June 13, 1960  4 Sheets-Sheet 4

INVENTOR.
DAVID FIRTH
BY M. A. Hobbs
ATTORNEY

United States Patent Office 3,020,737
Patented Feb. 13, 1962

3,020,737
COUPLING
David Firth, South Bend, Ind., assignor to Dodge Manufacturing Corporation, Mishawaka, Ind., a corporation of Indiana
Filed June 13, 1960, Ser. No. 35,810
17 Claims. (Cl. 64—11)

The present invention relates to couplings and more particularly to flexible couplings for connecting two rotatable, axially positioned shafts.

The conventional type of flexible couplings to which the present invention generally relates consists of a central yieldable element of rubber or rubber-like material connected to the ends of opposed shafts by demountable fittings rigidly secured to the two shafts. These prior couplings had the inherent disadvantages of not being capable of operating effectively and efficiently with substantially angular and parallel misaligned shafts or with appreciable end-floating of one or both of the shafts, unless couplings of relatively large diameter and with relatively large flexible elements were employed. These latter couplings had limited application in that their large size and weight rendered them impractical for high speed operations in which centrifugal force became an important factor. It is therefore one of the principal objects of the present invention to provide a flexible coupling which will operate efficiently in conjunction with misaligned shafts and which will perform satisfactorily and continuously over long periods of time without requiring servicing or other attention in order to maintain optimum performance.

Another object of the present invention is to provide a relatively simple and compact flexible coupling, the parts of which can be easily mounted on the two shafts after they have been placed in operating position relative to one another and which can be readily disassembled to the extent necessary to replace the flexible element without moving either the driving or driven shaft and without demounting the fixtures from the shaft.

Still another object of the invention is to provide a coupling of the aforesaid type having a flexible element which is capable of effectively absorbing torsional vibration and end floating of the two shafts connected thereby, and which is firmly clamped at each end by an expandable internal annular member and a continuous nonexpandable external annular member concentric with and disposed radially outwardly from the internal annular member.

A further object of the invention is to provide a flexible coupling in which the flexible element is clamped firmly in place and the fixtures secured rigidly to the shafts by the use of the same means, and the assembled parts of which present a continuous, smooth circumferential surface free of protrusions and marked indentations.

Among other objects of the present invention is the provision of an improved coupling device of the flexible type consisting of few parts assembled in a novel manner and constructed and designed to facilitate manufacture, assembly and installation of the coupling device and the inspection of the device for wear and proper adjustment while the device is in service.

Other objects and advantages of the invention will become apparent from the following description and accompanying drawings, wherein.

Figure 1:
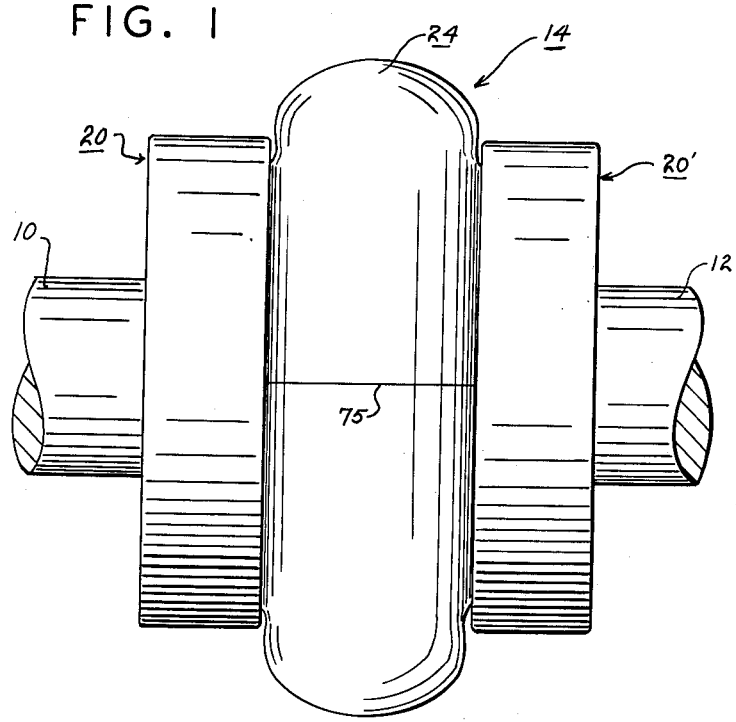
FIGURE 1 is a side elevational view of one form of my flexible coupling showing it mounted on the ends of two opposed shafts.
Figures 4, 5, 6:
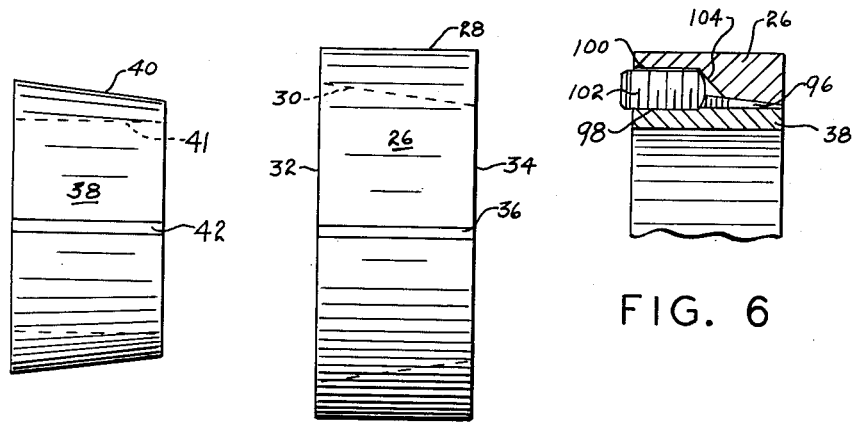
FIGURE 4 is an elevational view of a bushing forming a part of the coupling shown in the preceding figures.
FIGURE 5 is an elevational view of a hub forming a part of the coupling shown in the preceding figures.
FIGURE 6 is a fragmentary cross sectional view of the coupling taken on line 6—6 of FIGURE 2.
Figure 3:
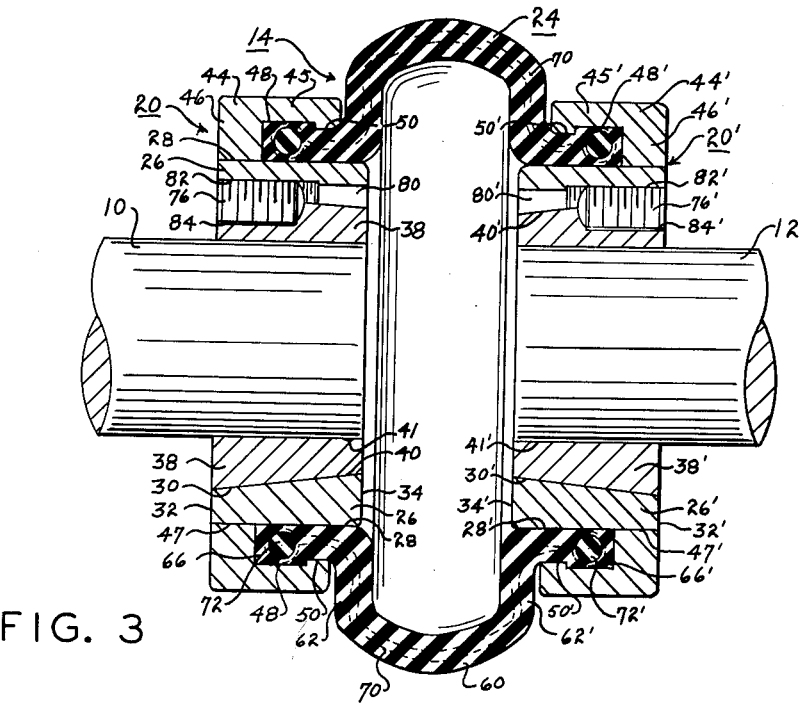
FIGURE 3 is a longitudinal cross sectional view of the present coupling taken on line 3—3 of FIGURE 2, with the ends of the two shafts on which the coupling is mounted being shown in elevation.
Figure 2:
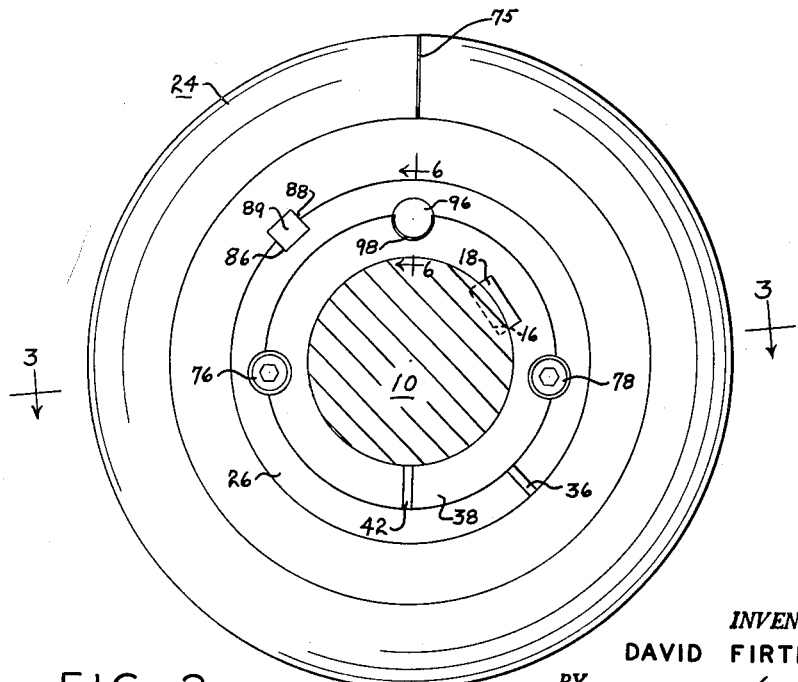
FIGURE 2 is an end view of the coupling shown in FIGURE 1, showing one of the shafts on which the coupling is mounted in operating position.

Referring more specifically to the drawings and to the embodiment of the invention illustrated in FIGURES 1 through 6, numerals 10 and 12 designate the driving and the driven shafts, respectively, and numeral 14 designates the present flexible coupling secured to the opposed ends of shafts 10 and 12. The driving shaft 10 may be, for example, the shaft of an electric motor, internal combustion engine or the like, and the driven shaft may be the power input shaft of a number of different types of industrial, commercial, farm and domestic equipment. The shafts 10 and 12 illustrated in the drawings are shown as being of the same diameter and having conventional key-ways 16 and shaft-keys 18.

The present flexible coupling consists principally of flange assemblies 20 and 20' for the driving and driven shafts 10 and 12, and a flexible torsion member 24 secured to and connecting the two flange assemblies. The two flange assemblies are preferably identical in construction and hence may be used interchangeably on the driving and driven shafts of the proper diameter; consequently, only one of the flange assemblies will be described in detail herein and like numerals will be used on like parts in the two flange assemblies, the only distinction being in the use of primes with the numerals of the driven flange 20'. Each flange assembly consists of a split annular-shaped hub 26 having an external surface 28 parallel with the axis of the shafts and an internal tapered surface 30 decreasing in diameter from the outer end 32 to the inner end 34, the hub being continuous throughout with the exception of a severing slot 36 of sufficient width to permit the hub to contract and expand appreciably during the operation of assembling the parts of the coupling and installing the coupling on opposed shafts. Between the hub 26 and the shaft is a split bushing 38 of substantially the same length as the hub having an external surface 40 tapered to correspond to the taper on the internal surface 30 on hub 26 and having an internal annular surface 41 parallel with the shaft, the bushing likewise being continuous throughout with the exception of a slot 42 of sufficient width to permit the bushing to be contracted during installation to grip the shaft firmly. Tapered surfaces 30 and 40 of the hub and bushing are assembled in face-to-face contact and are adapted to slide relative to one another as the flanges are assembled on a shaft in the manner to be described fully hereinafter.

Surrounding hub 26 and being somewhat shorter in axial length is an outer ring 44, one portion 45 of which is spaced from hub 26 and extends parallel with the axis of the shaft on which the flange assembly is mounted, and the other portion 46 of which extends inwardly from the outer edge of the ring to the point at which the internal surface 47 thereof will be firmly engaged by the external surface 28 of hub 26 as the latter is expanded during the installing operation. It is seen from FIGURE 3 that the two portions 45 and 46 of ring 44, together with the external surface of hub 26, form an annular groove 48 confined to a limited extent at its opening by an annular rib 50 on the inner face of ring portion 45, and adapted to receive one of the rims of torsion member 24. The external surface of ring 44 is smooth and uninterrupted by grooves, slots or recesses, or by projecting lugs, or screw or bolt heads.

The flexible torsion member 24 consists of an annular body section 60 of arcuate cross section joined to inwardly extending side walls 62 and 62' which terminate at their inner edges in outwardly extending flanges or beads 66 and 66', respectively. The torsion member is preferably pre-formed to the general configuration shown in FIGURES 1, 2 and 3 and is constructed of rubber or rubber-like synthetic material having a plurality of layers of fabric 70 of nylon cord or other suitable material embedded in body section 60 and side walls 62 and 62', and the beads 66 and 66' preferably having relatively hard annular cores 72 and 72' around which the ends of fabric are wrapped. The cores increase the effectiveness of rings 44 and 44' in gripping the beads. The two beads of member 24 are seated in grooves 48 and 48' and are clamped firmly in the grooves during the assembly operation with annular ribs 50 and 50' indenting the beads near the point of juncture between the beads and the respective side wall. While member 24 may be circumferentially continuous, it is preferably split as shown at slot 75 to facilitate assemblying the member on flanges 20 and 20', both during the initial installation and in the replacement of a new element for one worn beyond optimum service.

Bushing 38 is contracted into firm engagement with the shaft on which the flange assembly is mounted, and hub 26 is expanded into firm engagement with the internal surface of annular portion 46 of ring 44 by two screws 76 and 78, each being seated in a bore 80, one longitudinal portion 82 of which is formed in the internal surface 30 of hub 26, and the other portion 84 of which is formed in the external surface 40 of bushing 38. The type of securing means employed herein for contracting the bushing, and several modified forms thereof, are fully disclosed and claimed in my U.S. Patent No. 2,402,743, dated June 25, 1946; and hence the requirements of this general type will not be described in detail herein. Bore 80 intersects contacting surfaces 30 and 40 of the hub and bushing, respectively, preferably approximately equally near the longitudinal center of the bore. Portion 82 of the bore contains screw threads corresponding to those of the screw 76, and portion 84 is smooth but of a radius of sufficient size to permit the screw to rotate freely in the threads of portion 82 without becoming disengaged therefrom. The length of bore portion 84 is such that the forward end of the screw will readily seat on the inner end of said portion as the screw is tightened. Thereafter, further tightening of the screw forces the bushing inwardly relative to the hub and urges tapered surface 40 against and along tapered surface 30, causing the bushing to contract and adhere firmly and rigidly to the shaft. Simultaneously therewith, the hub is expanded, seating its external surface 28 firmly against the internal surface 47 of portion 46 and clamping beads 66 and 66' of torsion member 24 firmly in grooves 48 and 48'. While two screws are used in the embodiment of the invention shown in the drawings, three or more may be used, particularly in large couplings, though two will normally retain the coupling firmly on the shafts and the flexible torsion member in proper operative position in grooves 48 and 48'. Under severe operating conditions, key-way 16 and key 18 may be used to augment the gripping action of bushing 38 on each shaft, and key-ways 86 and 88 and key 89 may be used to augment the gripping action of hub 26 on the inner surface 47 of ring 44.

In order to facilitate disassembly of the present coupling, either for its removal from the shafts or for replacement of torsion member 24, a bore 96 similar to bore 80 is provided in adjacent surfaces of hub 26 and bushing 38. In bore 96, however, portion 98 in the bushing is threaded and the wall of portion 100 in the hub is smooth and of sufficient radius to permit the screw 102 to rotate freely therein without becoming disengaged from the screw threads of portion 98. Portion 100 is shorter than portion 98 to provide an abutment 104 for the end of set screw 102. Upon insertion and tightening of screw 102 after screws 76 and 78 have been loosened and possibly removed, the end of screw 102 engages abutment 104 and forces the hub inwardly endwise relative to the bushing, thereby permitting the bushing to expand and release its grip on the shaft, and simultaneously permitting the hub to contract and release its grip on the internal surface of portion 46 of ring 44. Ring 44 and torsion member 24 can now be readily removed from hub 26 and the flange assemblies easily removed from the respective shafts. After the coupling has been disassembled, screw 102 is removed from bore 96 and is not reinserted therein until the coupling is again disassembled.

Figure 8:
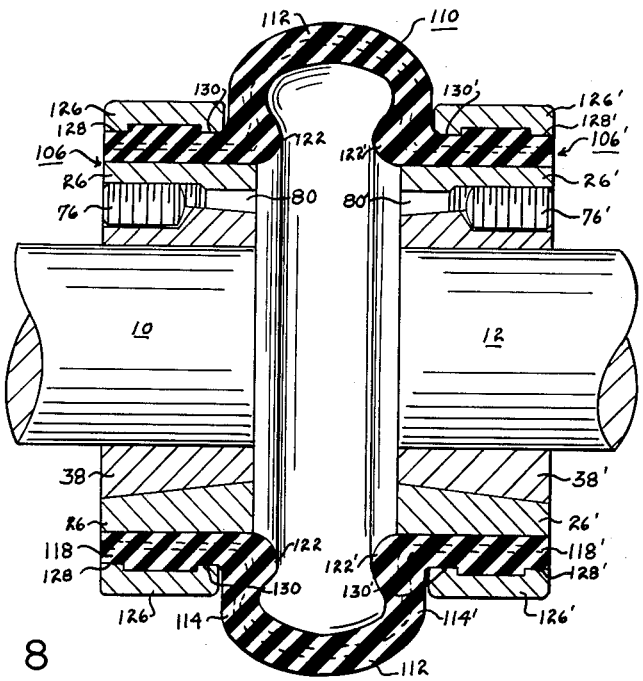
FIGURE 8 is a longitudinal cross sectional view of the modified form of the present coupling shown in FIGURE 7 taken on line 8—8 of FIGURE 7.
Figure 7:
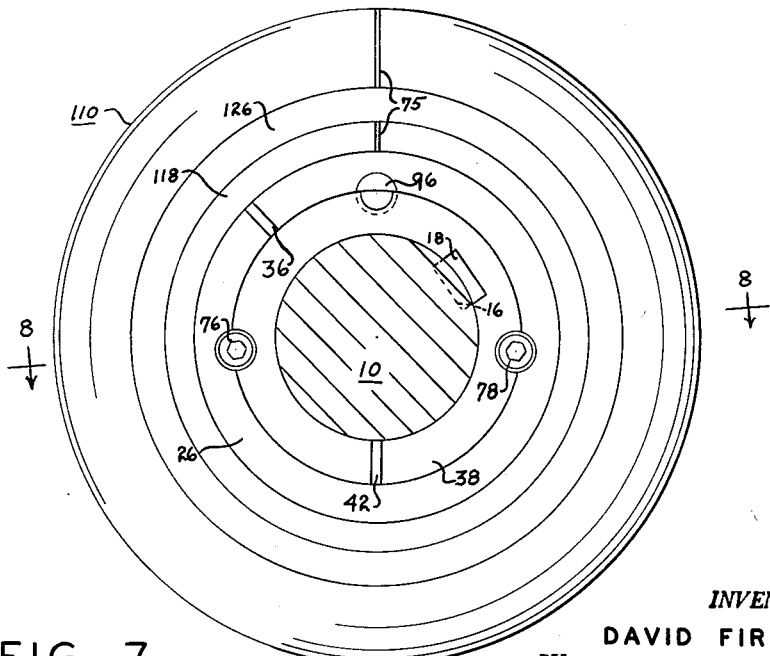
FIGURE 7 is an end view of a modified form of coupling showing one of the shafts on which the coupling is mounted in operative position.

In the modified form of the present invention disclosed in FIGURES 7 and 8, the hub, bushing and securing and removing means of flange assemblies 106 and 106' have the same construction and operate in the same manner as those corresponding elements in the embodiment of the invention disclosed in FIGURES 1 through 6; hence, these elements will not be described in detail here, and like numerals will be used to refer to parts identical in construction and operation with those previously described herein. The flexible torsion member 110 consists of an annular body section 112 of arcuate cross section joined to inwardly extending side walls 114 and 114' which terminate in outwardly extending beads 118 and 118'. The member is of rubber or rubber-like material and preferably has embedded therein fabric and cord in the manner described with reference to torsion member 24, and the points of juncture between the side walls and the respective beads are preferably reinforced by inwardly thickened portions 122 and 122' protruding inwardly toward each other. Beads 118 and 118' extend the full longitudinal length of hubs 26 and 26' and are held firmly onto the surface of the respective hubs by rings 126 and 126' which are spaced from the hubs and are provided with inwardly extending ribs 128 and 130 at the inner edges thereof for indenting and firmly holding beads 118 and 118' in place on the respective hubs.

When the coupling shown in FIGURES 7 and 8 is installed, the parts are assembled in the position shown, and screws 76 and 78 are tightened, forcing bushing 38 inwardly relative to hub 26, causing the bushing to contract tightly onto the surface of the shaft and simultaneously causing the hub to expand and clamp the bead of member 110 firmly between its exterior surface and the interior surface and ribs of ring 126. Inasmuch as the hub 26 does not contact ring 126, a large amount of clamping force can be applied to the beads of member 110 to retain said member in place on and in frictional engagement with the external surface of the hubs. The coupling is disassembled in the same manner as the previous embodiment described herein, and the flexible torsion element can be readily replaced without removing flange assemblies 106 and 106' from the respective shafts. The torsion member 110 is preferably of the split type in order to facilitate installation of the coupling and replacement of the member during service.

Figure 9:
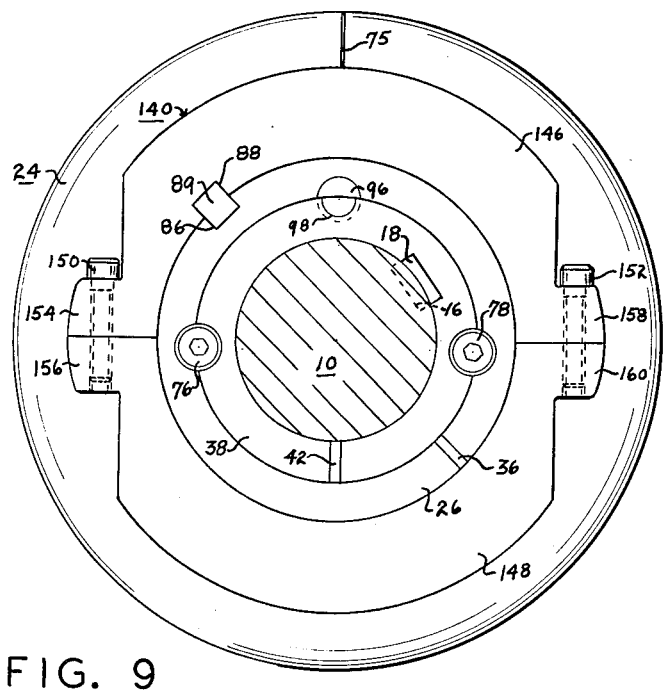
FIGURE 9 is an end view of a further modified form of my coupling.
Figure 10:
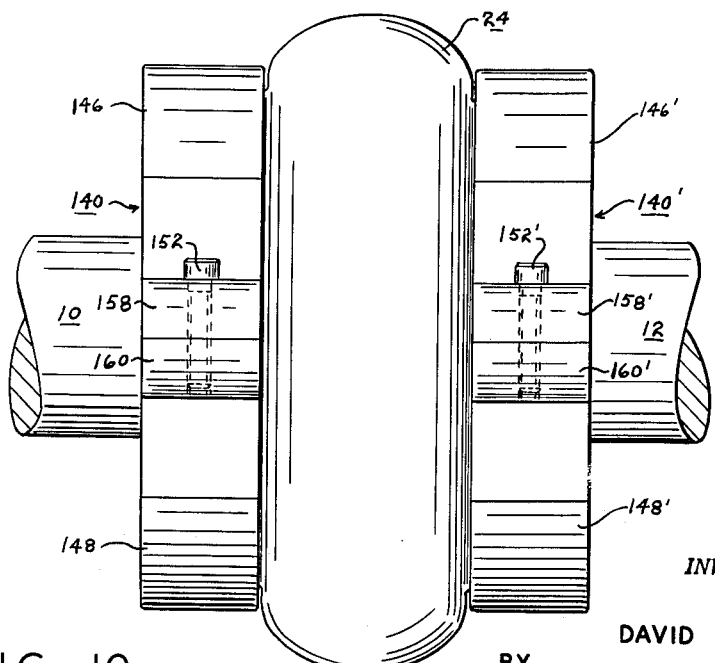
FIGURE 10 is a side elevational view of the coupling shown in FIGURE 9.

A further modification in the present coupling is shown in FIGURES 9 and 10 in which the parts thereof are identical with those of the embodiment shown in FIGURES 1 through 6, with the exception of the external rings 140 and 140' for clamping beads 66 and 66' of torsion member 24 against the external surface of hubs 26 and 26'. Applicable numerals used to identify parts of the previously described embodiments will be used with reference to this embodiment. In order to facilitate assembly and disassembly of the coupling, either in mounting it on and removing it from the shafts or replacing the torsion member, rings 140 and 140' are made in two half sections 146 and 148, and 146' and 148', respectively, so that the rings can be easily assembled around beads 66 and 66' after the remaining parts of the coupling have been assembled in place on the ends of the respective shafts. These two half sections of each ring are then secured rigidly together by two screws 150 and 152 on opposite sides of the ring, screw 150 extending through a boss 154 of section 146 into a threaded bore of a boss 156 of section 148, and screw 152 extending through a boss 158 of section 146 into a threaded bore of a boss 160 on section 148. After the two screws have been tightened in place, the two sections form, in effect, a solid ring serving the same purpose as ring 44 and having the same cross sectional configuration as that ring, consisting of portions 45 and 46 forming groove 48 for receiving a bead 66 of the torsion member 24. With this construction, replacement of the torsion member can easily be accomplished by merely removing or loosening screws 150 and 152, and 150' and 152', to release beads 66 and 66', without loosening and retightening screws 76 and 78, as required in the embodiments previously described herein.

It is seen from the foregoing description of the embodiments shown in the drawings that the present coupling is compact, relatively simple in construction, and can be readily installed and thereafter easily maintained in satisfactory operating condition. Further, the construction of the coupling presents a generally smooth, uninterrupted exterior surface and has sufficient adaptability to meet all requirements for overcoming misalignments of the driving and driven shafts and for absorbing torsional vibration and end floating of the shafts. While only three embodiments of the invention have been described in detail herein, various other modifications and changes may be made in the coupling without departing from the scope of the invention.

I claim:

1. A flexible coupling for connecting two shafts in end-to-end relation, comprising flanges for said shafts, each flange having a split bushing, a split hub surrounding said bushing in face-to-face contact therewith, a ring surrounding said hub but spaced from the external surface thereof, an annular flexible member with annular laterally projecting beads on each side thereof extending into the space between the respective hub and ring, and means between said bushing and hub for contracting said bushing about the shaft and expanding said hub into firm contact with the bead of said flexible member.

2. A flexible coupling for connecting two shafts in end-to-end relation, comprising flanges for said shafts, each flange having a split bushing, a split hub surrounding said bushing, a ring surrounding said hub and having an annular portion spaced from the external surface thereof, an annular flexible member with annular laterally projecting beads on each side thereof extending into the space between the respective hub and ring, and means for contracting said bushing about the shaft and expanding said hub into firm contact with the bead of said flexible member.

3. A flexible coupling for connecting two shafts in end-to-end relation, comprising flanges for said shafts, each flange having a bushing and having expanded and unexpanded positions, a split hub surrounding said bushing, a ring surrounding said hub and being spaced from the external surface thereof when said hub is in its unexpanded position, an annular flexible member with annular laterally projecting beads on each side thereof extending into the space between the respective hub and ring, and means for expanding said hub into firm contact with the bead of said flexible member.

4. A flexible coupling for connecting two shafts in end-to-end relation, comprising flanges for said shafts, each flange having a bushing and having expanded and unexpanded positions, a split hub surrounding said bushing, a ring surrounding said hub having an annular portion spaced from the external surface of said hub forming an inwardly facing groove and a portion on the outer end extending toward said hub and being spaced therefrom when said hub is in its unexpanded position, an annular rib on the inner end of said first mentioned portion, an annular flexible member with annular laterally projecting beads on each side thereof extending into the groove of the respective coupling flange, and means for expanding said hub into firm contact with the bead of said flexible member.

5. A flexible coupling for connecting two shafts in end-to-end relation, comprising flanges for said shafts, each flange having a bushing, a split hub surrounding said bushing, a ring surrounding said hub and having an annular portion spaced from the external surface of said hub forming an inwardly facing groove and a portion on the outer end extending toward said hub to a point in close proximity thereto, an annular rib on the inner end of said first mentioned portion, an annular flexible member with annular laterally projecting beads on each side thereof extending into the groove of the respective coupling flange, and means between said bushing and hub for contracting said bushing about the shaft and expanding said hub into firm contact with the bead of said flexible member.

6. A flexible coupling for connecting two shafts in end-to-end relation, comprising flanges for said shafts, each flange having a split bushing, a split hub surrounding said bushing, a ring surrounding said hub and spaced from the external surface thereof, an annular rib on the inner and outer ends of the internal surface of said ring, an annular flexible member with annular laterally projecting beads on each side thereof extending into the space between the respective hub and ring, and means for contracting said bushing about the shaft and expanding said hub into firm contact with the bead of said flexible member.

7. A flexible coupling for connecting two shafts in end-to-end relation, comprising flanges for said shafts, each flange having a bushing, and having expanded and unexpanded positions, a split hub surrounding said bushing, a ring surrounding said hub and spaced from the external surface thereof, an annular flexible member with annular laterally projecting beads on each side thereof extending into the space between the respective hub and ring, and means for expanding said hub into firm contact with the bead of said flexible member.

8. A flexible coupling for connecting two shafts in end-to-end relation, comprising flanges for said shafts, each flange having a split bushing with an internal annular surface generally parallel with the axis of the shafts and an external surface tapered from the outside end to the inside end of the bushing, a split hub surrounding said bushing with an external surface generally parallel with the axis of the shafts and an internal surface tapered to correspond with the taper on the external surface of said bushing for face-to-face contact therewith, a ring surrounding said hub having a portion extending parallel to and spaced from the external surface of said hub forming an inwardly facing groove and a portion on the outer end extending toward said hub to a point in close proximity thereto, an annular rib on the inner end of said first mentioned portion, a key-way and key interlocking said hub and ring to prevent relative rotation therebetween, an annular flexible torsion member of rubber-like material with annular laterally projecting beads on each side thereof extending into the space between the respective hub and ring, said bushing and hub having a plurality of bores intersecting the tapered surfaces thereof near the longitudinal center of said bores, the section of the bore in said hub having screw threads in the wall thereof and the section of the bore in said bushing being shorter than the section in said hub, a screw threadedly received in each of said bores for engagement with the inner end of the section of the bore in said bushing and for forcing said tapered surfaces together to contract said bushing about the shaft and to expand said hub into firm contact with said ring and with the bead of said flexible member, said bushing and hub having a further bore intersecting the tapered surfaces thereof, the section of the last mentioned bore in said bushing having screw threads in the wall thereof and the section of said bore in said hub being shorter than the section in said bushing, and a screw having threads corresponding to the threads in said bushing seated in the last mentioned bore for engagement with the inner end of the section of the bore in said hub and for forcing said tapered surfaces apart to permit said bushing to expand and said hub to contract.

9. A flexible coupling for connecting two shafts in end-to-end relation, comprising flanges for said shafts, each flange having a split bushing with an internal annular surface generally parallel with the axis of the shafts and an external surface tapered from the outside end to the inside end of the bushing, a split hub surrounding said bushing with an external surface generally parallel with the axis of the shafts and an internal surface tapered to correspond with the taper on the external surface of said bushing for face-to-face contact therewith, a ring surrounding said hub having a portion extending parallel to and spaced from the external surface of said hub forming an inwardly facing groove and a portion on the outer end extending toward said hub to a point in close proximity thereto, an annular rib on the inner end of said first mentioned portion, an annular flexible member with annular laterally projecting beads on each side thereof extending into the space between the respective hub and ring, said bushing and hub having a plurality of bores intersecting the tapered surfaces thereof near the longitudinal center of said bores, the section of the bore in said hub having screw threads in the wall thereof and the section of the bore in said bushing being shorter than the section in said hub, and a screw having threads corresponding to the threads in each of said bores seated in each bore for engagement with the inner end of the section of the bore in said bushing and for forcing said tapered surfaces together to contract said bushing about the shaft and to expand said hub into firm contact with said ring and with the bead of said flexible member.

10. A flexible coupling for connecting two shafts in end-to-end relation, comprising flanges for said shafts, each flange having a split bushing with an internal annular surface generally parallel with the axis of the shafts and an external surface tapered from the outside end to the inside end of the bushing, a split hub surrounding said bushing with an external surface generally parallel with the axis of the shafts and an internal surface tapered to correspond with the taper on the external surface of said bushing for face-to-face contact therewith, a ring surrounding said hub and having a portion spaced from the external surface thereof, an annular flexible member with annular laterally projecting beads on each side thereof extending into the space between the respective hub and ring, said bushing and hub having a plurality of bores intersecting the tapered surfaces thereof near the longitudinal center of said bores, the section of the bore in said hub having screw threads in the wall thereof and the section of the bore in said bushing being shorter than the section in said hub, a screw threadedly received in each of said bores for engagement with the inner end of the section of the bore in said bushing and for forcing said tapered surfaces together to contract said bushing about the shaft and to expand said hub into firm contact with said ring and with the bead of said flexible member, said bushing and hub having a further bore intersecting the tapered surfaces thereof, the section of the last mentioned bore in said bushing having screw threads in the wall thereof and the section of said bore in said hub being shorter than the section in said bushing, and a screw threadedly received in said bushing for engagement with the inner end of the section of the bore in said hub and for forcing said tapered surfaces apart to permit said bushing to expand and said hub to contract.

11. A flexible coupling for connecting two shafts in end-to-end relation, comprising flanges for said shafts, each flange having a split bushing with an internal annular surface generally parallel with the axis of the shafts and an external surface tapered from the outside end to the inside end of the bushing, a split hub surrounding said bushing with an external surface generally parallel with the axis of the shafts and an internal surface tapered to correspond with the taper on the external surface of said bushing for face-to-face contact therewith, a ring surrounding said hub and having an annular portion spaced from the external surface thereof, an annular flexible member with annular laterally projecting beads on each side thereof extending into the space between the respective hub and ring, said bushing and hub having a bore intersecting the tapered surfaces thereof near the longitudinal center of said bore, the section of the bore in said hub having screw threads in the wall thereof and the section of the bore in said bushing being shorter than the section in said hub, and a screw threadedly received in said bore for engagement with the inner end of the section of the bore in said bushing and for forcing said tapered surfaces together to contract said bushing about the shaft and to expand said hub into firm contact with the bead of said flexible member.

12. A flexible coupling for connecting two shafts in end-to-end relation, comprising flanges for said shafts, each flange having a split bushing with an internal annular surface generally parallel with the axis of the shafts and an external surface tapered from one end to the other, a split hub surrounding said bushing with an external surface generally parallel with the axis of the shafts and an internal surface tapered to correspond with the taper on the external surface of said bushing for face-to-face contact therewith, a ring surrounding said hub and having a portion spaced from the external surface thereof, an annular flexible member with annular laterally projecting beads on each side thereof extending into the space between the respective hub and ring, and means for forcing said tapered surfaces together to contract said bushing about the shaft and to expand said hub into firm contact with the bead of said flexible member.

13. A flexible coupling for connecting two shafts in end-to-end relation, comprising flanges for said shafts, each flange having a split bushing with an external surface tapered from one end to the other, a split hub surrounding said bushing and having an internal surface tapered to correspond with the taper on the external surface of said bushing for face-to-face contact therewith, a ring encircling said hub and having a portion spaced from the external surface thereof, an annular flexible member with annular laterally projecting beads on each side thereof extending into the space between the respective hub and ring, and means for urging the tapered surfaces of said bushing and hub together.

14. A flexible coupling for connecting two shafts in end-to-end relation, comprising flanges for said shafts, each flange having a split bushing with an internal annular surface generally parallel with the axis of the shafts and an external surface tapered from one end to the other, a split hub surrounding said bushing and having an external surface generally parallel with the axis of the shafts and an internal surface tapered to correspond with the taper on the external surface of said bushing for face-to-face contact therewith, two half-circular sections, screws rigidly connecting said sections to form a rigid ring encircling said hub and having a portion spaced from the external surface thereof, an annular flexible member with annular laterally projecting beads on each side thereof extending into the space between the respective hub and ring, and means for contracting said bushing about the shaft and expanding said hub into firm contact with the bead of said flexible member.

15. A flexible coupling for connecting two shafts in end-to-end relation, comprising flanges for said shafts, each flange having a split bushing with an external surface tapered from one end to the other, a split hub surrounding said bushing and having an internal surface tapered to correspond with the taper on the external surface of said bushing for face-to-face contact therewith, two half-circular sections, means rigidly connecting said sections to form a rigid ring encircling said hub and spaced from the external surface thereof, an annular flexible member with annular laterally projecting beads on each side thereof extending into the space between the respective hub and ring, and means for urging the tapered surfaces of said bushing and hub together.

16. A flexible coupling for connecting two shafts in end-to-end relation, comprising flanges for said shafts, each flange having a split bushing with an internal annular surface generally parallel with the axis of the shafts and an external surface tapered from one end to the other, a split hub surrounding said bushing with an external surface generally parallel with the axis of the shafts and an internal surface tapered to correspond with the taper on the external surface of said bushing for face-to-face contact therewith, a ring surrounding said hub and having a portion spaced from the external surface thereof, an annular flexible member of continuous circumferential structure and with annular laterally projecting beads on each side thereof extending into the space between the respective hub and ring, and means for forcing said tapered surfaces together to contract said bushing about the shaft and to expand said hub into firm contact with the bead of said flexible member.

17. In a coupling for connecting two shafts in end-to-end relation, a split bushing with an internal annular surface generally parallel with the axis of the shafts and a tapered external surface, a split hub surrounding said bushing with an external surface generally parallel with the axis of the shafts and an internal surface tapered to correspond with the taper on the external surface of said bushing for face-to-face contact therewith, said bushing and hub having a bore intersectiing the tapered surfaces thereof near the longitudinal center of the bore, the section of the bore in said hub having screw threads in the wall thereof and the section of the bore in said bushing being shorter than the section in said hub, and a screw in said bore for engagement with the inner end of the section of the bore in said bushing and for forcing said tapered surfaces together to contract said bushing about the shaft and to expand said hub.

References Cited in the file of this patent
UNITED STATES PATENTS

| 1,089,859 | Nutt | Mar. 10, 1914 |
| 2,901,896 | Reich | Sept. 1, 1959 |

FOREIGN PATENTS

| 754,992 | France | Nov. 17, 1933 |